Dec. 22, 1942.   E. JÖRG   2,305,786
PHOTOGRAPHIC CAMERA
Filed Feb. 8, 1940   2 Sheets-Sheet 1

Inventor:
Eugen Jörg
By: Singer, Ehlert, Starr & Carlberg
Attys:

Dec. 22, 1942.  E. JÖRG  2,305,786
PHOTOGRAPHIC CAMERA
Filed Feb. 8, 1940   2 Sheets-Sheet 2

Inventor:
Eugen Jörg
BY
Singer, Ehlert, Stern & Carlberg
Attys.

Patented Dec. 22, 1942

2,305,786

UNITED STATES PATENT OFFICE 2,305,786

PHOTOGRAPHIC CAMERA

Eugen Jörg, Stuttgart, Germany; vested in the Alien Property Custodian

Application February 8, 1940, Serial No. 317,981 In Italy December 7, 1939

8 Claims. (Cl. 95—40)

The present invention relates to improvements in photographic cameras and particularly is directed to foldable rollfilm cameras of the type in which the bellows with the camera objective thereon is automatically extended by spring actuated braces when the hinged cover of the camera casing is opened.

It is an object of the invention to provide a rollfilm camera with an automatically extended bellows in which the cover opens lengthwise of the camera casing and during its opening movement actuates a mechanism which moves the camera objective a substantial distance beyond the outer end of the cover. In a camera of this type the cover need not be made as long as the required extension of the bellows, but may be made substantially shorter, for instance as short as the smallest side of the picture to be produced with the camera.

Another object of the invention is to provide a rollfilm camera of the above mentioned type in which the cover, which is hingedly connected lengthwise of the camera casing, is substantially as long as the smallest side of the rectangular picture adapted to be produced by the camera, thus reducing the width of the camera casing to a minimum.

Still another object of the invention is the arrangement of means on the braces and actuated by a member on the cover during its movement for rigidly supporting the camera objective in its operative position in which latter position the camera objective projects beyond the outer end of the cover.

Other objects of the invention will be apparent or will be specifically pointed out in the following description forming a part of this specification, but the invention is not limited to the embodiment hereinafter described, as various forms may be adapted within the scope of the claims.

Figure 1:
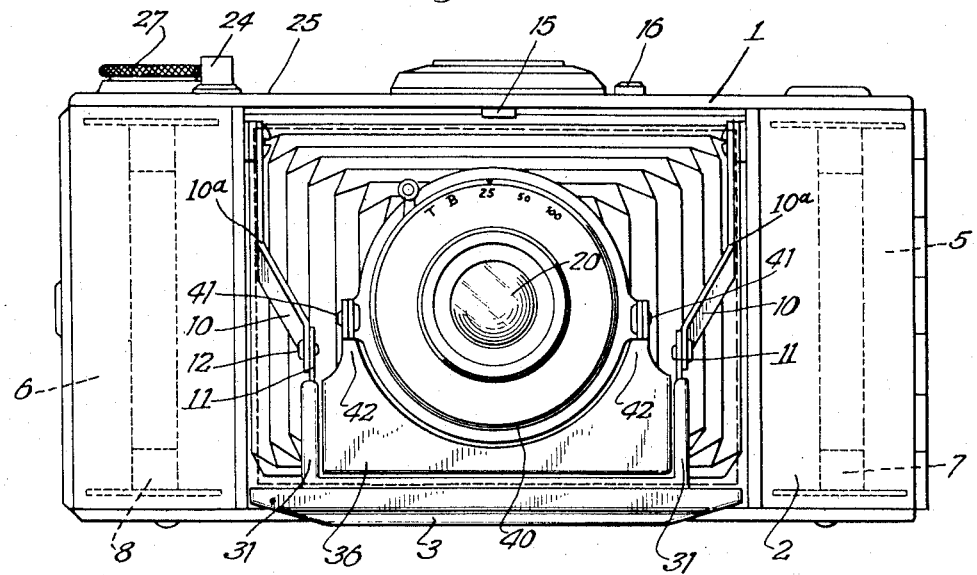
Fig. 1 is a front elevation view of the rollfilm camera when in open operative position.

Referring to the drawings, the camera casing 1 is of rectangular shape and is provided in its front wall 2 with a cover 3 hingedly connected to the long side of the camera casing by a hinge pin 4 or the like. The cover 3 is substantially as wide in longitudinal direction of the camera casing as the long side of the rectangular picture adapted to be taken with the camera, while the length of the cover 3 is substantially as large as the width of the camera casing or the short side of the picture, the size of which is indicated in dotted lines in Fig. 1. It will be noted that the total length of the camera casing 1 includes at the ends thereof the customary compartments 5 and 6 for the film supply spool 7 and film take-up spool 8 respectively.

A pair of braces 10 and 11 pivotally connected at 12 with each other is arranged at each side of the cover 3 and connects the latter with the camera casing 1 to support the cover 3 in its open position at a right angle with respect to the front wall 2 of the camera casing 1. Each pair of braces 10, 11 is subjected to the action of a spring 14 which automatically forces the braces 10, 11 into an extended position to thereby open the cover 3 as soon as a locking device 15, which normally holds the cover 13 in its closed position, is released by the depression of a button 16. The upper braces 10 are bent inwardly at 10ᵃ (Fig. 1) to properly meet the lower braces 11 which extend upwardly from brackets 31 attached to the cover 3. The carrier 40 of the photographic objective 20 of the camera is operatively connected with the cover 3, and when the latter is opened the carrier 40 is moved automatically into a position in which the objective 20 is ready for operation. It usually is only necessary to set and tension the shutter, to adjust the diaphragm and to focus the objective by rotatably adjusting its mount. In the present instance the shutter release knob 24 is mounted on the narrow top wall 25 of the camera casing 1 adjacent the film advancing knob 27.

Heretofore it was customary in foldable rollfilm cameras of the type described—in which the pictures produced are rectilinear—to hinge the cover about an axis extending transversely of the camera casing or, in other words, about an axis parallel to the small side of the rectangular camera casing. In such a case it is not difficult to make the cover of sufficient length as is required for extending the bellows a distance equal to the focal length of the objective.

If, however, the cover is hinged about an axis extending parallel to the long side of the camera casing it is not possible to make the cover longer than the width of the camera casing and therefore the maximum extension of the bellows until now was equal to the length of the cover. Such a length of the bellows limits the size of the picture to be taken to a square, the sides of which are approximately as long as the camera casing is wide.

Figure 2:
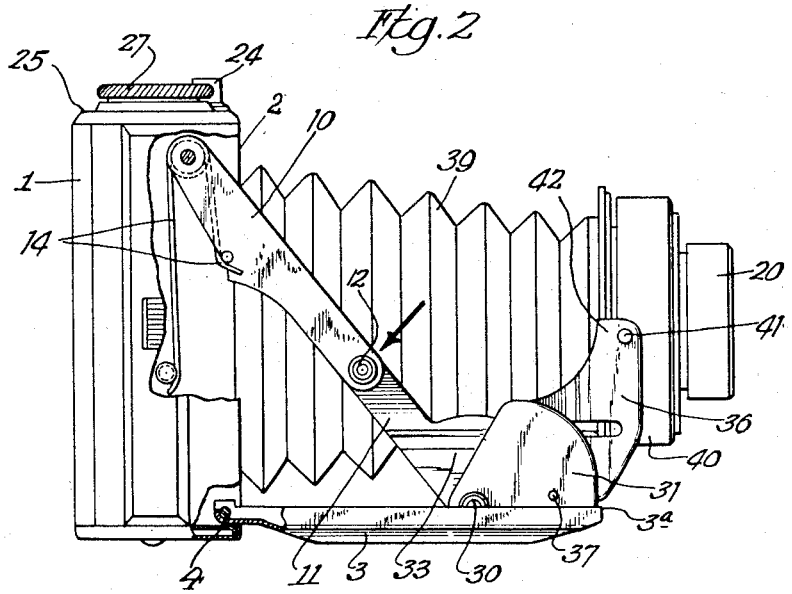
Fig. 2 is a side elevation view of the rollfilm camera as shown in Fig. 1, with certain parts in section and broken away.

In order to produce pictures which are rectangular and whose long side is longer than the width of the camera casing, it is necessary in a camera of the last mentioned type to extend the bellows a greater distance as the cover is long, because the camera objective employed will have a longer focal length and must be moved beyond the outer end of the cover when the latter is open. Such a position of the objective is illustrated in Fig. 2 and the mechanism which accomplishes this result forms the principal object of the present invention and will now be described in detail.

The lower ends of the braces 11 are each pivotally attached at 30 to the brackets 31 which are secured fixedly to the outer end of the cover 3 on the inner side thereof. The lower end of each brace 11 is provided with a sector-shaped portion 33 whose center point coincides with the pivot axis 30. Forwardly of this pivot axis 30 the sector-shaped portion 33 has attached thereto a laterally extending pin 34 projecting into a guide slot 35 of a member 36 which supports the camera objective 20. This member 36 is pivotally supported by a shaft 37 resting in bearings 38 on the inside of the cover 3 and positioned about half-way between the pivot axis 30 and the outer edge 3ª of the cover 3. The camera objective 20 is mounted in an objective carrier 40, which may contain the shutter and the diaphragm, as is well known in the art. This carrier 40 has also one end of the extensible bellows 39 attached thereto and is pivotally connected at approximately two diametrically opposed points at 41 to two upwardly extending portions 42 of the member 36 so as to be pivotally supported by the latter about an horizontal axis in a plane slightly below the horizontal plane in which the optical axis of the objective 20 is positioned. The other end of the bellows 39 is attached to the camera casing in conventional manner. It will be noted from Figs. 2 and 3 that in the operative position of the camera the pivot axis 41 of the objective 20 is positioned in a vertical plane substantially rearwardly of the front end of the objective, but substantially forwardly of a vertical plane in which the pivot axis 37 of the members 36 is positioned. In fact, in the operative position of the camera the pivot axis 41 is positioned in front of the outer edge 3ª of the cover 3, thus supporting the camera objective 20 a substantial distance beyond the forward edge 3ª of the cover 3 and making the total extension of the bellows 39, including the objective 20 greater than the length of the cover 3. In this operative position of the camera the member 36 is held rigid in the illustrated vertical position by the pin 34 on the sector-shaped lower end 33 of each brace 11, because these pins 34 engage one end of the guide slots 35 of the member 36.

Figure 3:
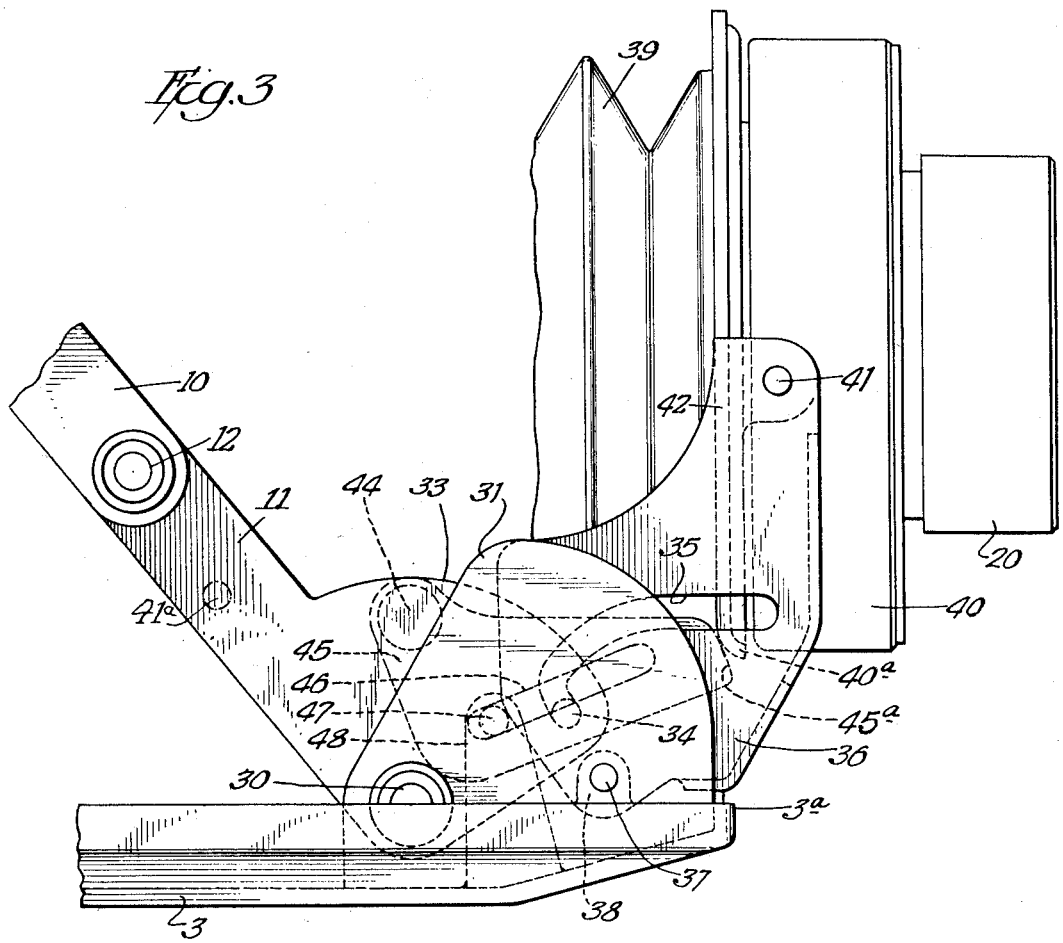
Fig. 3 illustrates in an enlarged scale the brace-structure and the objective supporting means of the camera when the latter is in operative position.

In order to prevent in the operative position of the camera a tilting of the objective carrier 40 and the objective 20 about the axis 41 each brace 11 has pivotally secured at its sector-shaped portion 33 at 44 a plate 45 provided with a guide slot 46. A pin 47 on the upper end of a bracket 48 secured to the inner face of the cover 3 projects into the guide slot 46 so as to move the forward end 45ª of the plate 45 against the lower end 40ª of the objective carrier 40 when the camera is unfolded as shown in Fig. 3.

The operation of the brace structure when the camera is folded is as follows:

In order to close the camera the operator exerts a downwardly directed pressure on the braces 10, 11 approximately at their pivot connection at 12 as indicated by the arrow in Fig. 2. This has the effect that the braces 11 swing anti-clockwise about their lower pivot point 30, thereby initiating the closing movement of the cover 3. At the same time the plate 45 is moved away from the lower portion 40ª of the objective carrier 40 so that the member 36 can rotate about the pivot axis 41 during the further closing movement of the cover 3. The pin 34 on the sector-shaped portion 33 of the brace 11 moves along the guide slot 35 in the member 36 and rotates the latter anti-clockwise about the shaft 37 until the pivot axis 41 about which the objective 20 is relatively rotated reaches the position indicated with 41ª in Fig. 3, when the cover 3 is closed. The guide slot 35 in the member 36 is of such a shape that the camera objective 20 during the closing of the camera is substantially moved along its optical axis from its extended position (Figs. 2 and 3) to its retracted position, when the camera is completely folded together, thus folding the bellows 39 together uniformly without kinking.

Figure 4:
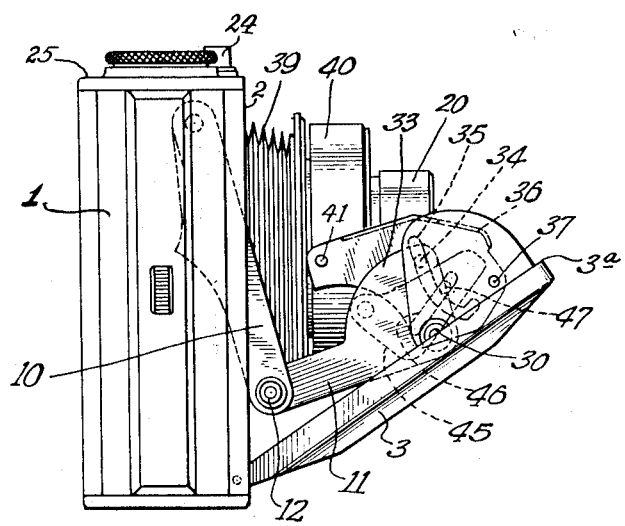
Fig. 4 illustrates a side elevation view of the camera, partly folded.

Fig. 4 illustrates the various parts of the camera and the brace structure when the camera is partly folded together. The spring 14 are of sufficient strength to push the braces 10, 11 outwardly and to thereby open the cover 3 and move the objective 20 into operative position as illustrated in Figs. 2 and 3 as soon as the locking device 15, 16 is manually released.

What I claim is:

1. In a foldable photographic camera, a rectangular camera casing provided with a cover hingedly attached to one of the longer sides of said casing and supporting the camera objective in its operative position when the cover is opened, two foldable braces, each consisting of two parts pivotally connected with each other, the ends of said braces being pivotally attached to said camera casing and said cover respectively, and in their extended position support the latter in its open position at a right angle with respect to the camera casing, manually releasable locking means for keeping said cover in its closed position, spring means for automatically moving said cover into its open position, when said locking means is released, an objective support pivotally mounted on said cover about an axis which is spaced a greater distance from the hinged end of said cover than the pivot connection between said braces and said cover, said objective support being operatively connected with said braces to be moved by the latter from a substantially horizontal position with respect to the cover when the latter is closed to a substantially vertical position with respect to said cover when the latter is opened, said camera objective being pivotally attached to said objective support to remain with its optical axis always in the same direction when the objective support is rotated about its pivot axis with said cover, the pivot axis of said objective with said objective support in the operative position of the camera being located in a plane in front of the outer end of said cover, and means on said braces for engaging said camera objective in its operative position to prevent an with one end to said cover, and means for operatively connecting said objective support with said means for limiting the opening movement of the cover to be moved by said means from a substantially horizontal position with respect to the cover when the latter is closed to a substantially vertical position with respect to said cover when the latter is opened, said support having said camera objective pivotally attached to a portion which in the open position of said cover extends beyond the outer end of said cover.

8. In a foldable rollfilm camera, a rectangular camera casing, a camera objective, an extensible bellows connecting said camera casing with said objective, a cover hinged to one of the longer sides of said casing and supporting the camera objective in its extended operative position when the cover is opened, means including a pair of braces, each being foldable between their ends connecting the camera casing with said cover for limiting the opening movement of the latter to a right angle with respect to the camera casing, spring means for automatically moving said cover into its open position an objective support pivotally supported by said cover and operatively connected with said means for limiting the opening movement of the cover to be moved by said means from a substantially horizontal position with respect to the cover when the latter is closed to a substantially vertical position with respect to said cover when he latter is opened, said support having said camera objective pivotally attached to a portion which in the open position of said cover extends beyond the outer end of said cover, and means controlled by the movement of said cover for engaging in the open position of the same a portion of said objective to prevent an accidental tilting movement of the same in its extending operative position.

EUGEN JORG.